Oct. 30, 1951 C. R. DOTY 2,573,317

CONSECUTIVE BLANK COLUMN DETECTOR

Filed July 13, 1950 2 SHEETS—SHEET 1

INVENTOR
CHARLES R. DOTY

BY Charles P. Roberg
ATTORNEY

INVENTOR
CHARLES R. DOTY
BY Charles P. Boberg
ATTORNEY

Patented Oct. 30, 1951

2,573,317

UNITED STATES PATENT OFFICE 2,573,317

CONSECUTIVE BLANK COLUMN DETECTOR

Charles R. Doty, Poughkeepsie, N. Y., assignor to International Business Machines Corporation, New York, N. Y., a corporation of New York Application July 13, 1950, Serial No. 173,662

5 Claims. (Cl. 164—115)

This invention relates to record-controlled perforating machines, and it has particular reference to that portion of a record-controlled perforating machine which is affected by the presence of consecutive blank columns in a control record.

Control records such as perforated record cards frequently contain fields in which many consecutive blank columns are present. For example, assume that a short name containing, say, ten characters is recorded in an alphabetic field having twenty-five columns assigned to it. In this case most of the columns in the field would be blank. When a record card of this kind is employed to control a perforating machine, such as a tape perforator, it is customary practice in the art to read each of the blank columns individually, and as each blank column is read, the record sheet (that is, the tape) is advanced one space. Usually a "space" code is recorded in the tape for each blank column read in the card. Obviously this practice of reading blank columns repeatedly is a waste of time which not only reduces the efficiency of the card-controlled tape perforating operation but also that of the subsequent tape-controlled card perforating operation. Prior attempts have been made to avoid this difficulty by requiring the card-punch operator to place a special "skip" designation after the last letter of a name to indicate that the remaining columns in that field are blank and may be skipped. This method has not been entirely satisfactory, however, due to the human element which is involved. The present invention does not depend upon human control and therefore is more dependable.

A general object of the present invention is to effect certain novel improvements in record-controlled perforating machines which make it possible to save the time that ordinarily would be lost in multiple bank column reading and spacing operations.

A more specific object is to provide a device for automatically detecting the presence of two or more consecutive blank columns in any field of the record card, thereby conditioning the machine for a skip operation or other function to utilize the time that otherwise would be lost in reading the blank columns.

Other objects of the invention will be pointed out in the following description and claims and illustrated in the accompanying drawings, which disclose, by way of an example, the principle of the invention and the best mode, which has been contemplated, of applying that principle.

Figure 1:
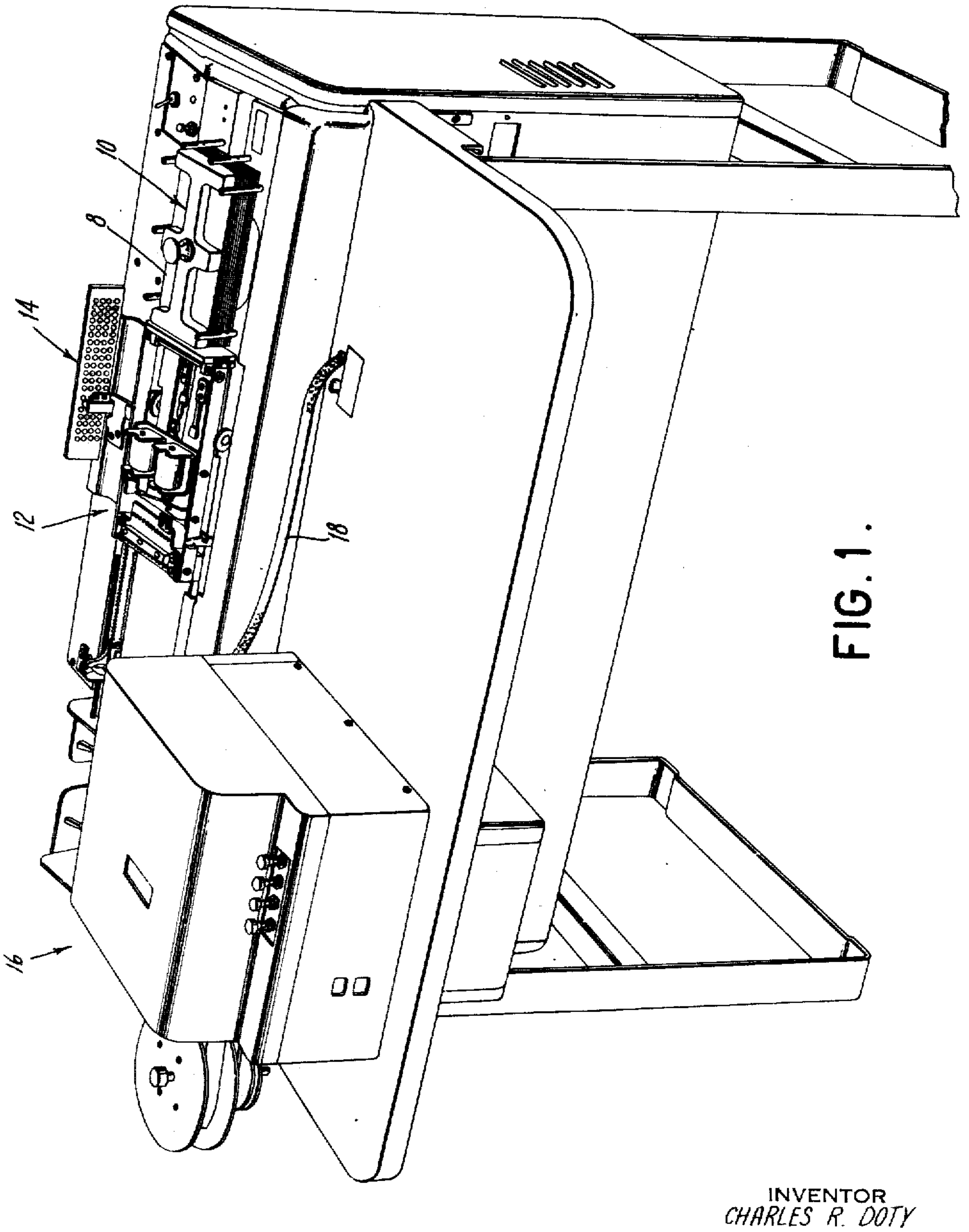
Fig. 1 is a perspective view of a typical card-controlled tape perforating machine in which the present invention may be utilized.

The card-controlled tape perforating machine shown in Fig. 1 is adapted to operate under the control of conventional record cards 8 which are fed successively from a card hopper 10 to a card reading unit 12. This machine is of the general type disclosed, for example, in C. R. Doty Patent No. 2,340,800, granted February 1, 1944. The details of the card reading unit 12 are familiar to those skilled in the art and therefore are not disclosed herein. Each card is advanced column-by-column past a set of reading elements which senses the perforations in each card column. A column emitter unit 14 of well-known type commonly is associated with the card reading unit for emitting successive column impulses as the respective card columns are being sensed.

A tape punch unit 16 operates under the control of the card sensing elements of the card reader 12 to perforate a telegraphic tape 18 in accordance with the information read from each card. The construction of these tape punch units likewise is familiar to those skilled in the art. The tape 18, when completed, contains the information, read from a number of record cards, in a compact form suitable for mailing to another location, where the tape may be utilized by a tape-controlled card perforating machine for reproducing the original set of record cards. This makes it unnecessary to ship the original cards from one location to another and thereby eliminates the risk of losing or damaging the cards in transit.

Figure 2:
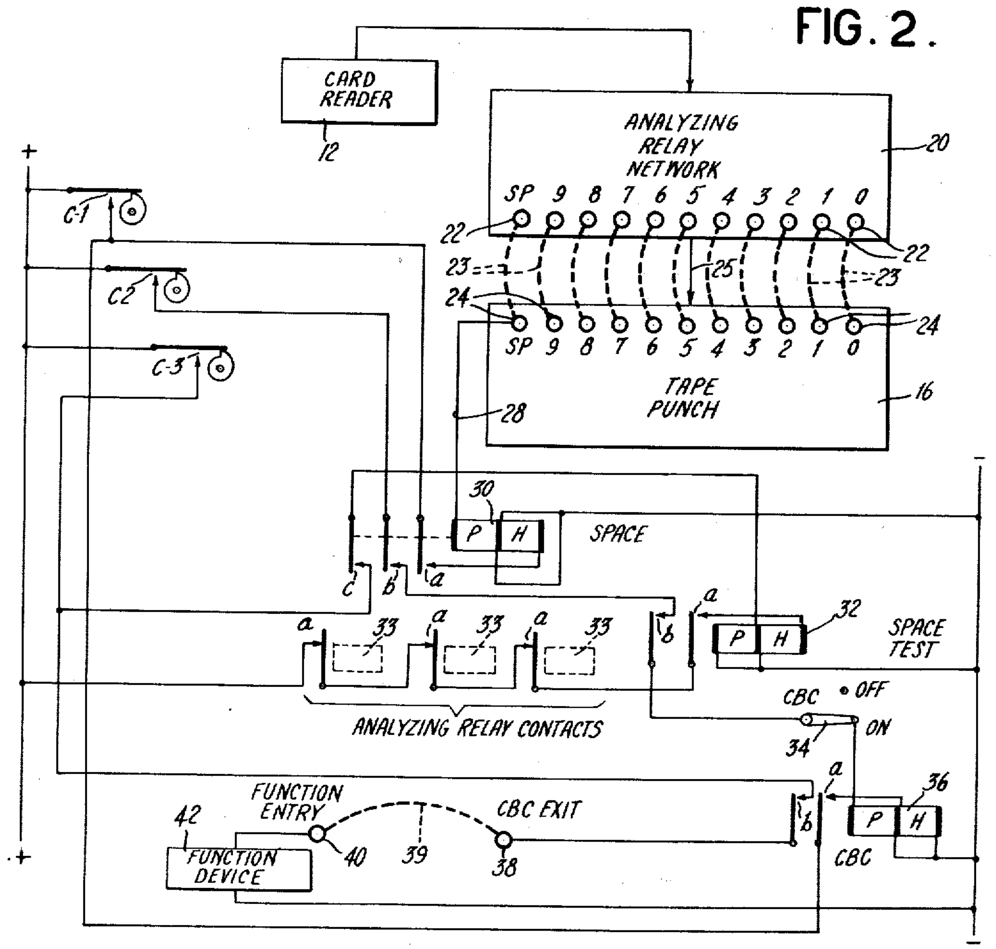
Fig. 2 is a partially schematic circuit diagram of a consecutive blank column detector embodying the principles of the invention.

Referring now to Fig. 2, the information read from the cards by the card reader 12 is in the well-known statistical code and must be converted to telegraphic code before it is recorded on the tape by the tape punch 16. The function of translating from one code system to another is performed by an analyzing relay network 20, which may be of the type shown in the aforesaid Doty patent.

Preferably, the impulses for digits and spaces which are read from the card and translated by the network 20 are brought out to exit hubs 22 (Fig. 2) located on a control panel (not shown). The digit and space (SP) hubs 22 usually are connected by plugwires 23 to corresponding digit and space (SP) entry hubs 24, which are terminals for the respective circuits that operate the various punch elements of the tape punch unit 16. These direct plugwire connections 23 may in some instances be superseded by indirect connections made through selector relays or the like. This arrangement affords a certain amount of flexibility in the event that digit or space codes are to be recorded. Impulses for alphabetic characters read from the card are conducted to the operating circuits of the tape punch unit 16 through internal connections, indicated by the arrow 25 (Fig. 2).

As mentioned above, the card reader 12 frequently encounters a series of consecutive blank columns while reading a record card, this being most likely to occur in the alphabetic fields of the card. When consecutive blank columns are sensed, the space (SP) exit hub 22 is repeatedly impulsed. Through the intervening plugwire 23, these successive impulses are impressed upon the SP entry hub 24. It is possible also that the SP entry hub 24 may receive an impulse from another source, as for example when a character read from the card is being recoded to a space in the tape. One instance in which this would occur is when an "X" skip designation read from the card is recoded to a space in the type. The present invention is so designed that a control function is initiated whenever two successive space impulses are received at the tape punch unit 16. This may occur when two consecutive blank columns are read in the card, or when a character read from the card is recoded to a space and is then followed by a blank column.

As shown in Fig. 2, a conductor 28 connects the SP entry hub 24 to the pickup coil of a double-wound "space" relay 30. As the SP hub 24 is impulsed to set up the unit 16 for punching a space code in the tape, the relay 30 is picked up. As relay 30 energizes, it closes its contacts *a*, *b* and *c*. Closure of the *a* contact establishes a holding circuit for relay 30 through the cam contact C–1 and the hold coil of this relay. As the *c* contact closes, it extends a circuit from cam contact C–3 to the pickup coil of a "space test" relay 32. The closure of relay contact 30*b* is without effect during the first space impulse.

As the "space test" relay 32 energizes, it closes its *a* and *b* contacts. When the *a* contact closes, a holding circuit is established through a series of normally closed *a* contacts of certain analyzing relays 33 and thence through the hold winding of relay 32. The analyzing relays 33 are included in the analyzing relay network 20, and they pertain to digits and other characters read from the card. If a blank card column is sensed by the card reader 12, all of these *a* contacts remain closed. Hence, if a second consecutive space impulse is received from the card reader, the relay 32 will be held energized throughout the second cycle. If, however, the sensing of a blank card column is followed by the sensing of a digit or other character, one of the analyzing relays 33 will open its *a* contact and thereby break the holding circuit for the space test relay 32.

The closure of relay contact 32*b*, like that of relay contact 30*b*, does not have any effect until the second consecutive space impulse is received. Assuming that this condition is fulfilled, the closure of cam contact C–2 extends a circuit through the *b* contacts of the relays 30 and 32 and through a CBC (consecutive blank column) switch 34, assumed to be closed, to the pickup coil of a relay 36. The relay 32 obviously cannot become energized until C–3 time in the cycle; whereas the cam contact C–2 closes and opens before C–3 time occurs, as can be seen from the timing chart in Fig. 3. Hence, during the first cycle in which a space impulse is received, the relay 32 is not energized soon enough to effect energization of relay 36. During the second consecutive cycle in which a space impulse is received, relay 32 is already being held energized through its aforesaid holding circuit when C–2 closes. Therefore, relay 36 is energized in response to the second consecutive space impulse.

The CBC switch 34 represents any device which determines whether or not CBC control shall be effective. In actual practice this switch would be replaced by a "CBC on" relay which is operated in response to impulses from the column emitter 14 (Fig. 1) for rendering the CBC circuits effective while certain card fields are being read.

When the relay 36 energizes, it is held through the cam contact C–1, relay contact 36*a* and its holding coil. As cam contact C–3 closes, it extends a circuit through the *b* contact of relay 36 (now closed) to a CBC exit hub 38 on the control panel. The resulting impulse which is emitted by the hub 38 can be utilized to initiate any desired control operation. As indicated in Fig. 2, the CBC exit hub 38 is connected by a plugwire 39 to an appropriate function entry hub 40 on the control panel. An impulse emitted by the hub 38 in response to the presence of two consecutive blank columns in the controlling record card is routed through the plugwire 39 and an entry hub 40 to a function device 42, which has been shown diagrammatically. The device 42 could consist, for example, of a "skip start" relay which, when operated, causes the card carriage to skip the remaining blank columns in the current series of consecutive blank columns for presenting the next active field of the record card to the sensing elements of the card reader 12. Alternatively, it may be preferred to initiate a program of operations such as, for example, punching a figure-shift code followed by a letter G code in the tape (this being the familiar "Figure G" skip code) and skipping the card to the next active field. Means for carrying out operations of this character are well known in the art.

Figure 3:
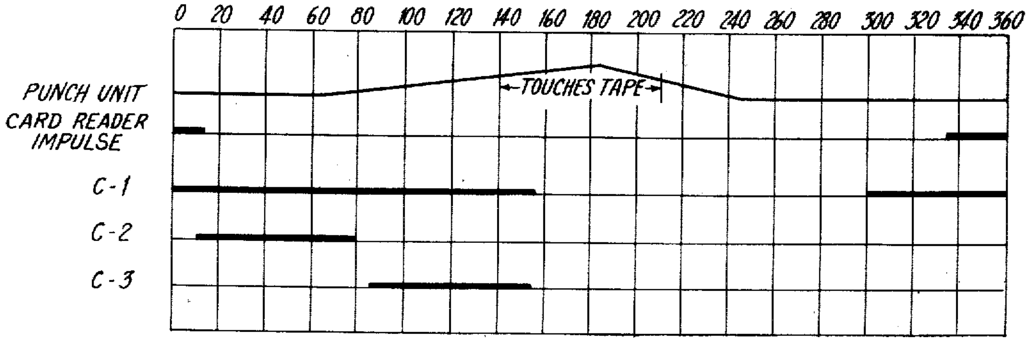
Fig. 3 is a timing chart illustrating the operation of certain elements shown in Fig. 2.

Briefly summarizing the above described operations, the first space impulse received at the SP entry hub of the tape punch 16 causes the space relay 30 to energize and pick up the space test relay 32 at C–3 time in the cycle (Fig. 3). Nothing further occurs in this cycle inasmuch as the CBC relay 36 cannot be picked up after the C–2 time has gone by. The space test relay 32 is held energized as long as space impulses continue to be received. When the second consecutive space impulse is received, the relay 36 is picked up at C–2 time through the *b* contacts of relays 30 and 32. Then, at C–3 time in this second cycle, a CBC impulse is emitted from the hub 38.

The invention disclosed herein affords a completely automatic and dependable means for detecting a consecutive-blank-column condition in the controlling record card. It does not rely upon any special symbol punched in the card, and it materially shortens the time required by the card reader to traverse blank fields in the card. The apparatus will function also when a blank column follows a "space" punched in response to a card code.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for perforating a record sheet under the control of a source record having columns of data designations interspersed with consecutive blank columns, the combination of means for reading the source record column-by-column and for producing an electrical impulse each time a blank column is read in the source record, first relay means controlled by said reading means and adapted to operate for a limited time in response to each blank column impulse, second relay means controlled by said first relay means and said reading means, said second relay means being adapted to commence operation in response to an initial operation of said first relay means and being thereafter maintained in operation by said reading means as long as consecutive blank columns continue to be read in the source record, delay means controlling said second relay means to delay the operation of said second relay means for a predetermined time interval after said first relay means commences operating in response to the first blank column impulse, functional means including a third relay means for causing said machine to perform a special function when said third relay means is operated, and testing means effective during a time interval not greater than said predetermined time interval after said first relay means commences operating to test said first and second relay means for concurrent operation thereof, said testing means controlling said third relay means to cause operation thereof only when said first relay means and said second relay means are operating concurrently, whereby at least two consecutive blank columns must be read from the source record before said functional means will operate.

2. In a machine for perforating a record sheet under the control of a source record having columns of data designations interspersed with consecutive blank columns, the combination of means for reading the source record column-by-column, a sheet perforating apparatus including a device for perforating a space designation in the sheet each time said device is activated, means operatively connecting said reading means and said perforating apparatus to activate said space designation perforating device each time a blank column is read in the source record, a space impulsing means concurrently operable with said space designation perforating device for producing an impulse each time said space designation perforating device is operated, first impulse-responsive means adapted to be activated in response to the first space impulse, second impulse-responsive means adapted to be activated in response to the second impulse, and functional means controlled by said second impulse-responsive means for causing the machine to perform a special function whenever said second impulse-responsive means is activated in response to the reading of two consecutive blank columns in the source record.

3. In a machine for perforating a record sheet under the control of a source record having columns which are read consecutively to determine the data perforated in the sheet, a consecutive blank column detector comprising column analyzing means for reading the columns of the source record consecutively to detect which columns are blank and which columns contain data, a settable device adapted to assume alternate set and unset conditions, setting means controlled by said column analyzing means for setting said settable device in response to the detection of a blank column in the source record, timing means controlling said setting means to prevent said settable device from being set during a predetermined time interval following the reading of any record column and less than the period between two successive column readings, holding means for holding said settable device in its set condition, restoring means controlled by said column analyzing means and operative when a data column is detected in the source record to disable said holding means and restore said settable device to its unset condition, and testing means effective within said predetermined time interval following each column reading to test the condition of said settable device, whereby said testing means will find said settable means in a set condition only after said settable means has been held in such condition for two consecutive column readings.

4. In a machine for perforating a record sheet under the control of a source record having columns of data designations interspersed with blank columns, the combination of means for reading the source record column-by-column, a sheet perforating apparatus including a device for perforating a space designation in the sheet each time said device is activated, means operatively connecting said reading means and said perforating apparatus to activate said space designation perforating device each time a blank column is read in the source record, an impulsing relay concurrently operable with said space designation perforating device for producing an impulse each time said space designation perforating device is operated, a test relay adapted to operate in response to a space impulse produced by said impulsing relay, analyzing means controlled by said reading means and governing said test relay to render said test relay inoperative if said space impulse is not followed by a second space impulse when the next succeeding record column is read, a control relay adapted to operate in response to a second impulse by said impulsing relay, provided said test relay has not been rendered inoperative by the intervention of said analyzing means when a column of the source record is read, and functional means controlled by said controlled relay for causing the machine to perform a special function whenever said control relay is operated in response to the perforation of two consecutive space designations in the record sheet.

5. In a machine for perforating a record sheet under the control of a source record having columns of data designations interspersed with blank columns, the combination of means for reading the source record column-by-column, a sheet perforating apparatus including a device for perforating a space designation in the sheet each time said device is activated, means operatively connecting said reading means and said perforating apparatus to activate said space designation perforating device each time a blank column is read in the source record, a first relay, a second relay, a first timing device, a second timing device, a pickup circuit for said first relay controlled by said reading means to pick up said first relay each time said space designation perforating device is activated, a holding circuit for said first relay controlled by said first timing device to hold said first relay for a predetermined time interval following each pickup thereof and for releasing said first relay prior to the reading of the next record column, a pickup circuit for said second relay controlled by said first relay and said second timing device for picking up said second relay within a latter part of said time interval, provided said first relay is being held, a holding circuit for said second relay including analyzing means controlled by said reading means for holding said second relay if a blank column is read in the source record, said analyzing means being effective to interrupt said second holding circuit if the column is not blank, a third relay, a third timing device, and a pickup circuit for said third relay controlled by said third timing device and said second relay for picking up said third relay in an early part of said time interval if said second relay is already being held, whereby said third relay is picked up when two consecutive blank columns are detected in the source record.

CHARLES R. DOTY.

REFERENCES CITED

The following references are of record in the file of this patent:

UNITED STATES PATENTS

| Number | Name | Date |
|---|---|---|
| 2,340,800 | Doty | Feb. 1, 1944 |
| 2,346,268 | Mills et al. | Apr. 11, 1944 |

Certificate of Correction

Patent No. 2,573,317 October 30, 1951

CHARLES R. DOTY

It is hereby certified that error appears in the printed specification of the above numbered patent requiring correction as follows:

Column 6, line 63, for "controlled" read *control*;

and that the said Letters Patent should be read as corrected above, so that the same may conform to the record of the case in the Patent Office.

Signed and sealed this 5th day of February, A. D. 1952.

[SEAL]

THOMAS F. MURPHY,
*Assistant Commissioner of Patents.*